US011287598B2

(12) United States Patent
Kumar et al.

(10) Patent No.: US 11,287,598 B2
(45) Date of Patent: *Mar. 29, 2022

(54) DUAL LAYER MICRO OPTICAL FIBER CABLE

(71) Applicant: Sterlite Technologies Limited, Aurangabad (IN)

(72) Inventors: Sravan Kumar, Aurangabad (IN); Kishore Sahoo, Aurangabad (IN); Atul Mishra, Aurangabad (IN); Vikash Shukla, Aurangabad (IN)

(73) Assignee: Sterlite Technologies Limited, Aurangabad (IN)

( * ) Notice: Subject to any disclaimer, the term of this patent is extended or adjusted under 35 U.S.C. 154(b) by 0 days.

This patent is subject to a terminal disclaimer.

(21) Appl. No.: 16/835,174

(22) Filed: Mar. 30, 2020

(65) Prior Publication Data

US 2020/0225436 A1 Jul. 16, 2020

Related U.S. Application Data

(63) Continuation of application No. 16/262,890, filed on Jan. 30, 2019, now Pat. No. 10,641,982.

(30) Foreign Application Priority Data

Dec. 6, 2018 (IN) .............................. 201821046206

(51) Int. Cl.
G02B 6/44 (2006.01)
(52) U.S. Cl.
CPC ......... *G02B 6/4494* (2013.01); *G02B 6/4497* (2013.01)

(58) Field of Classification Search
CPC ...................................................... G02B 6/44
See application file for complete search history.

(56) References Cited

U.S. PATENT DOCUMENTS

| 5,343,549 | A * | 8/1994 | Nave ................... | G02B 6/4434 385/103 |
| 10,261,278 | B1 * | 4/2019 | Murthy ............... | G02B 6/4415 |
| 10,388,430 | B1 * | 8/2019 | Evans .................. | H01B 9/003 |
| 10,641,982 | B1 * | 5/2020 | Kumar ................ | G02B 6/4438 |
| 2008/0240662 | A1 * | 10/2008 | Helvenstein ......... | G02B 6/4433 385/106 |
| 2015/0268427 | A1 * | 9/2015 | Register, III ......... | G02B 6/4434 385/110 |
| 2017/0235068 | A1 * | 8/2017 | Debban ................ | G02B 6/4433 385/110 |

(Continued)

*Primary Examiner* — Tina M Wong

(57) ABSTRACT

The present disclosure provides an optical fiber cable (100). The optical fiber cable (100) includes a first layer (108) and a second layer (110). The second layer (110) surrounds the first layer (108). The first layer (108) includes a first plurality of buffer tubes (122). The second layer (110) comprises a second plurality of buffer tubes (124). Each buffer tube of the first plurality of buffer tubes (122) and the second plurality of buffer tubes (124) has a thickness of at most 0.15 millimeter. Each buffer tube of the first plurality of buffer tubes (122) and the second plurality of buffer tubes (124) includes a first material layer (126) and a second material layer (128). The second material layer (128) surrounds the first material layer (126). The first material layer (126) is made of polybutylene terephthalate. The second material layer (128) is made of polycarbonate.

20 Claims, 1 Drawing Sheet

(56) References Cited

U.S. PATENT DOCUMENTS

2019/0113701 A1\* 4/2019 Murthy ................ G02B 6/4494
2019/0219783 A1\* 7/2019 Ly ........................ G02B 6/3873
2020/0225436 A1\* 7/2020 Kumar ................. G02B 6/4494

\* cited by examiner

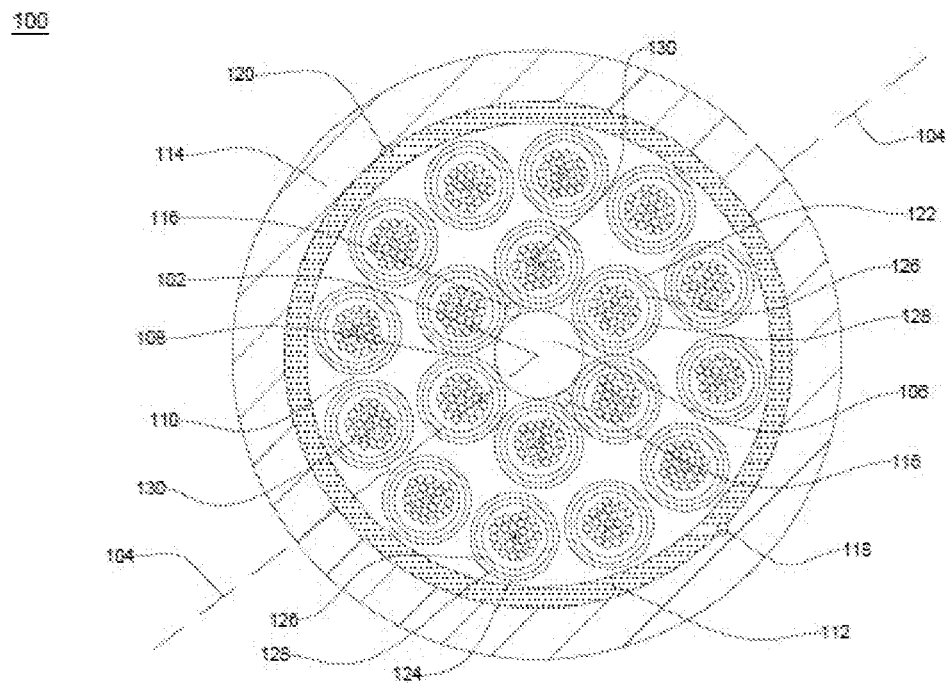

DUAL LAYER MICRO OPTICAL FIBER CABLE

The present application is based on, and claims priority from an Indian Application Number 201821046206 filed on 6 Dec. 2018 and from a U.S. application Ser. No. 16/262,890 filed on 30 Jan. 2019.

TECHNICAL FIELD

The present disclosure relates to the field of optical fiber cable and, in particular, relates to a dual layer micro optical fiber cable with low diameter and light weight.

BACKGROUND

Optical fiber cables have secured an important position in building network of modern communication systems across the world. These optical fiber cables are used numerous applications like underground applications, aerial applications, FTTH applications and the like. One such type of optical fiber cables is micro optical fiber cables. Typically, these micro optical fiber cables include multiple buffer tubes enclosing multiple optical fibers. These micro optical fiber cables are known for their small diameter and light weight. In addition, these micro optical fiber cables are installed by blowing the optical fiber cable into a duct with simultaneously pushing the optical cable into the duct. The blowing is done by injecting a high volume of compressed air into the duct which flows inside the duct at high speed. Accordingly, the high speed propels the optical fiber cable into the duct. The optical fiber cables are blown with a cable blowing machine. Typically, the blowing performance of the cable blowing machine depends on the diameter and the weight of the micro optical fiber cable.

The existing micro optical fiber cables have certain limitations when it comes to smooth blowing operations. The existing micro optical fiber cables are not suitable for installation in the micro ducts due to large diameter. Also, these micro optical fiber cables are heavy. This leads to a poor blowing performance from the cable blowing machine. There is a continuous challenge in reducing diameter of buffer tubes in order to reduce overall weight and diameter of the micro optical fiber cables. There is a continuous need to overcome these disadvantages and provide micro optical fiber cables with low diameter and weight for smooth blowing performance.

OBJECT OF THE DISCLOSURE

A primary object of the present disclosure is to provide an optical fiber cable having low diameter.

Another object of the present disclosure is to provide the optical fiber cable with reduced weight.

Yet another object of the present disclosure is to increase blowing performance of the optical fiber cable.

Yet another object of the present disclosure is to provide the optical fiber cable that is easy to install in micro ducts.

Yet another object of the present disclosure is to provide the optical fiber cable with dual layer buffer tubes that provides high crush resistance.

SUMMARY

In an aspect, the present disclosure provides an optical fiber cable. The optical fiber cable includes a first layer. The first layer includes a first plurality of buffer tubes. Further, the optical fiber cable includes a second layer. The second layer includes a second plurality of buffer tubes. The second layer surrounds the first layer. Each buffer tubes of the first plurality of buffer tubes and the second plurality of buffer tubes has a thickness of at most 0.15 millimeter. Each buffer tube in the first plurality of buffer tubes and the second plurality of buffer tubes is made of a first material layer and a second material layer. The second material layer surrounds the first material layer. The first material layer is made of polybutylene terephthalate. The second material layer is made of polycarbonate.

In an embodiment of the present disclosure, the optical fiber cable further includes a central strength member. The central strength member lies substantially along a longitudinal axis of the optical fiber cable. The longitudinal axis passes through a geometrical center of the optical fiber cable (100).

In an embodiment of the present disclosure, the first material layer has a thickness of about 75 microns. The second material layer has a thickness of about 75 microns.

In an embodiment of the present disclosure, each buffer tube of the first plurality of buffer tubes and the second plurality of buffer tubes encloses a plurality of optical fibers. Further, total number of the plurality of optical fibers in each of the first plurality of buffer tubes and the second plurality of buffer tubes is 24.

In an embodiment of the present disclosure, each buffer tube of the first plurality of buffer tubes and the second plurality of buffer tubes is filled with gel. The gel prevents ingression of water inside each buffer tube of the first plurality of buffer tubes and the second plurality of buffer tubes.

In an embodiment of the present disclosure, each buffer tube of the first plurality of buffer tubes and the second plurality of buffer tubes has a first diameter of about 1.25 millimeter and a second diameter of about 1.55 millimeter.

In an embodiment of the present disclosure, the optical fiber cable includes a plurality of water swellable yarns positioned over a central strength member. The plurality of water swellable yarns prevents ingression of water inside the optical fiber cable.

In an embodiment of the present disclosure, the optical fiber cable further includes a third layer and a fourth layer. The third layer surrounds the second layer. The third layer is made of a plurality of binder yarns. The third layer facilitates absorption of water, moisture and prevents ingression of the water inside the optical fiber cable. The fourth layer surrounds the third layer. The fourth layer is a jacket layer. The fourth layer has a thickness of about 0.5 millimeter.

In an embodiment of the present disclosure, the optical fiber cable includes a plurality of ripcords. The plurality of ripcords is positioned diametrically opposite between a third layer and a fourth layer. The plurality of ripcords facilitates stripping of the fourth layer.

In an embodiment of the present disclosure, the optical fiber cable has tensile strength in a range of about 500 Newton to 1000 Newton. The optical fiber cable has crush resistance of about 500 Newton per 10 centimeter.

In an embodiment of the present disclosure, the optical fiber cable with 432 optical fibers has diameter in a range of about 8.6 millimeter to 9.2 millimeter.

In an embodiment of the present disclosure, the optical fiber cable has reduced diameter and reduced weight which enables better blowing performance of the optical fiber cable. The optical fiber cable can be blown up to 1000 meters in 12 mm duct and up to 1500 meters in 14 mm duct.

In another aspect, the present disclosure provides an optical fiber cable for installation in micro ducts. The optical fiber cable includes a first layer. The first layer includes a first plurality of buffer tubes. Further, the optical fiber cable includes a second layer. The second layer includes a second plurality of buffer tubes. The second layer surrounds the first layer. Each buffer tube of the first plurality of buffer tubes and the second plurality of buffer tubes has a thickness of at most 0.15 millimeter. Each buffer tube in the first plurality of buffer tubes and the second plurality of buffer tubes is made of a first material layer and a second material layer. The second material layer surrounds the first material layer. The first material layer is made of polybutylene terephthalate. The second material layer is made of polycarbonate. The first material layer has a thickness of about 75 microns. The second material layer has a thickness of about 75 microns. The optical fiber cable has reduced diameter and reduced weight which enables better blowing performance of the optical fiber cable. The optical fiber cable can be blown up to 1000 meters in 12 mm duct and up to 1500 meters in 14 mm duct.

In yet another aspect, the present disclosure provides an optical fiber cable for installation in micro ducts. The optical fiber cable includes a central strength member. The central strength member lies substantially along a longitudinal axis of the optical fiber cable. The longitudinal axis passes through a geometrical center. In addition, the optical fiber cable includes a first layer. The first layer includes a first plurality of buffer tubes. The first layer surrounds the central strength member. Further, the optical fiber cable includes a second layer. The second layer includes a second plurality of buffer tubes. The second layer surrounds the first layer. Furthermore, the optical fiber cable includes a third layer surrounding the second layer. The third layer is made of a plurality of binder yarns. Moreover, the optical fiber cable includes a fourth layer surrounding the third layer. The fourth layer is a jacket layer. Each buffer tube of the first plurality of buffer tubes and the second plurality of buffer tubes has a thickness of at most 0.15 millimeter. Each buffer tube in the first plurality of buffer tubes and the second plurality of buffer tubes is made of a first material layer and a second material layer. The second material layer surrounds the first material layer. The first material layer is made of polybutylene terephthalate. The second material layer is made of polycarbonate. The first material layer has a thickness of about 75 microns. The second material layer has a thickness of about 75 microns. The first material layer has a thickness of about 75 microns. The second material layer has a thickness of about 75 microns. The optical fiber cable has reduced diameter and reduced weight which enables better blowing performance of the optical fiber cable. The optical fiber cable can be blown up to 1000 meters in 12 mm duct and up to 1500 meters in 14 mm duct.

STATEMENT OF THE DISCLOSURE

The present disclosure provides an optical fiber cable. The optical fiber cable includes a first layer. The first layer includes a first plurality of buffer tubes. Further, the optical fiber cable includes a second layer. The second layer includes a second plurality of buffer tubes. The second layer surrounds the first layer. Each buffer tubes of the first plurality of buffer tubes and the second plurality of buffer tubes has a thickness of at most 0.15 millimeter. Each buffer tube in the first plurality of buffer tubes and the second plurality of buffer tubes is made of a first material layer and a second material layer. The second material layer surrounds the first material layer. The first material layer is made of polybutylene terephthalate. The second material layer is made of polycarbonate.

BRIEF DESCRIPTION OF FIGURES

Having thus described the disclosure in general terms, reference will now be made to the accompanying FIGURES, wherein:

FIG. 1 illustrates a cross sectional view of an optical fiber cable, in accordance with various embodiments of the present disclosure.

It should be noted that the accompanying FIGURE is intended to present illustrations of exemplary embodiments of the present disclosure. The FIGURE is not intended to limit the scope of the present disclosure. It should also be noted that accompanying FIGURE is not necessarily drawn to scale.

DETAILED DESCRIPTION

Reference will now be made in detail to selected embodiments of the present disclosure in conjunction with accompanying FIGURES. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying FIGURES are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates a cross sectional view of an optical fiber cable 100, in accordance with various embodiments of the present disclosure. In general, the optical fiber cable 100 is used for communication purposes. In addition, the optical fiber cable 100 is used for installation in micro ducts. Moreover, the optical fiber cable 100 is used for underground installations. In an embodiment of the present disclosure, the optical fiber cable 100 is a 432F optical fiber cable 100. In addition, 432F corresponds to 432 optical fibers. Further, the optical fiber cable 100 has a low diameter which makes the optical fiber cable 100 suitable for installation in micro ducts.

The optical fiber cable 100 includes a central strength member 106, a first layer 108, a second layer 110, a third layer 112 and a fourth layer 114. In addition, the optical fiber cable 100 includes a plurality of water swellable yarns 116 and a plurality of ripcords 118, 120.

The optical fiber cable 100 includes the central strength member 106. The central strength member 106 lies substantially along a longitudinal axis 104 of the optical fiber cable 100. In general, the longitudinal axis 104 of the optical fiber cable 100 is an axis along the lengthwise direction of the optical fiber cable 100. In addition, the longitudinal axis 104 passes through a geometrical center 102 of the optical fiber cable 100. In general, the geometrical center of the optical fiber cable 100 is a central point of the optical fiber cable 100. In other words, the geometrical center 102 of the optical fiber cable 100 is defined as a midpoint of the diameter of the optical fiber cable 100. Further, the central strength member 106 provides physical strength to the optical fiber cable 100 and resists over bending of the optical fiber cable 100. Moreover, the central strength member 106 provides tensile strength to the optical fiber cable 100. In addition, the optical fiber cable 100 has tensile strength in a range of about 500 Newton to 1000 Newton. In an embodiment of the present disclosure, the central strength member 106 is made of fiber reinforced plastic. The fiber reinforced plastic is a composite material having a polymer matrix reinforced with glass fibers. In an example, the fiber reinforced plastics includes but may not be limited to glass fibers, carbon fibers, aramid fibers, basalt fibers and the like. In another embodiment of the present disclosure, the central strength member 106 is made of any other suitable material.

The central strength member 106 provides physical strength to the optical fiber cable 100 and resists over bending of the optical fiber cable 100. The central strength member 106 provides tensile strength to the optical fiber cable 100. Further, the central strength member 106 is characterized by a diameter measured along the cross section. In an embodiment of the present disclosure, the diameter of the central strength member 106 is about 1.8 millimeter. The diameter of the central strength member 106 has a tolerance of ±0.05 millimeter. In another embodiment of the present disclosure, the diameter of the central strength member 106 may vary.

The optical fiber cable 100 includes the first layer 108. In an embodiment of the present disclosure, the first layer 108 is helically stranded around the central strength member 106. The first layer 108 includes a first plurality of buffer tubes 122 positioned around the central strength member 106. In addition, the cross section of each buffer tube of the first plurality of buffer tubes 122 is circular in shape. In an embodiment of the present disclosure, the cross section of each buffer tube of the first plurality of buffer tubes 122 may be of any suitable shape. In an embodiment of the present disclosure, each buffer tube of the first plurality of buffer tubes 122 has a uniform structure and dimensions. In an embodiment of the present disclosure, each buffer tube of the first plurality of buffer tubes 122 is a loose buffer tube.

In an embodiment of the present disclosure, the first plurality of buffer tubes 122 includes six buffer tubes. In addition, each buffer tube of the six buffer tubes encloses 24 optical fibers. Thus, the first layer 108 includes a total of 144 (6*24=144) optical fibers. In another embodiment of the present disclosure, number of the first plurality of buffer tubes 122 of the first layer 108 may vary.

The optical fiber cable 100 includes a second layer 110. The second layer 110 surrounds the first layer 108. The second layer 110 includes a second plurality of buffer tubes 124. In an embodiment of the present disclosure, the second plurality of buffer tubes 124 includes 12 buffer tubes. In addition, each buffer tube of the 12 buffer tubes encloses 24 optical fibers. Thus, the second layer 110 includes a total of 288 (12*24=288) optical fibers. In another embodiment of the present disclosure, number of optical fibers in the second plurality of buffer tubes 124 may vary. In addition, the cross section of each buffer tube of the second plurality of buffer tubes 124 is circular in shape. In an embodiment of the present disclosure, the cross section of each buffer tube of the second plurality of buffer tubes 124 may be of any suitable shape. In an embodiment of the present disclosure, each buffer tube of the second plurality of buffer tubes 124 has a uniform structure and dimensions. In an embodiment of the present disclosure, each buffer tube of the second plurality of buffer tubes 124 is a loose buffer tube.

Furthermore, each buffer tube of the first plurality of buffer tubes 122 and the second plurality of buffer tubes 124 encloses a plurality of optical fibers 130. In general, optical fibers are thin strands of fiber used for transmission of data over long distances and at high bandwidth. In an embodiment of the present disclosure, each buffer tube of the first plurality of buffer tubes 122 and the second plurality of buffer tubes 124 includes 24 optical fibers. In another embodiment of the present disclosure, number of the plurality of optical fibers 130 inside each buffer tube of the first plurality of buffer tubes 122 and the second plurality of buffer tubes 124 may vary. In an embodiment of the present disclosure, total number of the plurality of optical fibers 130 in the optical fiber cable 100 is 432. In an embodiment of the present disclosure, each of the plurality of optical fibers 130 has a diameter of about 200 microns. In another embodiment of the present disclosure, the diameter of each of the plurality of optical fibers 130 may vary.

Each buffer tube of the first plurality of buffer tubes 122 and the second plurality of buffer tubes 124 is a tube for encapsulating the plurality of optical fibers 130. In general, each buffer tube of the first plurality of buffer tubes 122 and the second plurality of buffer tubes 124 provides support and protection to the corresponding plurality of optical fibers 130 against crush, bend and stretch. In addition, each of the first plurality of buffer tubes 122 and the second plurality of buffer tubes 124 protects the plurality of optical fibers 130 and prevents ingression of water inside the optical fiber cable 100. In an embodiment of the present disclosure, each buffer tube in the first plurality of buffer tubes 122 and the second plurality of buffer tubes 124 is filled with a gel. In an embodiment of the present disclosure, the gel prevents ingression of water inside each buffer tube of the first plurality of buffer tubes 122 and the second plurality of buffer tubes 124.

Each buffer tube in the first plurality of buffer tubes 122 and the second plurality of buffer tubes 124 has a thickness. In an embodiment of the present disclosure, the thickness of each buffer tube in the first plurality of buffer tubes 122 and the second plurality of buffer tubes 124 is equal. In an embodiment of the present disclosure, the thickness of each buffer tube in the first plurality of buffer tubes 122 and the second plurality of buffer tubes 124 is about 0.15 millimeter. In another embodiment of the present disclosure, the thickness of each buffer tube in the first plurality of buffer tubes 122 and the second plurality of buffer tubes 124 is at most 0.15 millimeter. In yet another embodiment of the present disclosure, the thickness of each buffer tube in the first plurality of buffer tubes 122 and the second plurality of buffer tubes 124 is in a range of about 0.15 millimeter±0.025 millimeter. In yet another embodiment of the present disclosure, the thickness of each buffer tube in the first plurality of buffer tubes 122 and the second plurality of buffer tubes 124 may vary.

Further, each buffer tube in the first plurality of buffer tubes 122 and the second plurality of buffer tubes 124 has a first diameter and a second diameter. The first diameter represents an inner diameter and the second diameter represents an outer diameter of the buffer tube. In an embodiment of the present disclosure, the first diameter and the second diameter of each buffer tube in the first plurality of buffer tubes 122 and the second plurality of buffer tubes 124 is fixed. In an embodiment of the present disclosure, the first diameter of each buffer tube in the first plurality of buffer tubes 122 and the second plurality of buffer tubes 124 is about 1.25 millimeters when each buffer tube includes 24 optical fibers. In another embodiment of the present disclosure, the first diameter of each buffer tube in the first plurality of buffer tubes 122 and the second plurality of buffer tubes 124 may vary. The first diameter of each buffer tube of the first plurality of buffer tubes 122 and the second plurality of buffer tubes 124 has a tolerance of about ±0.025 millimeter.

In an embodiment of the present disclosure, the second diameter of each buffer tube of the first plurality of buffer tubes 122 and the second plurality of buffer tubes 124 is about 1.55 millimeters when each buffer tube includes 24 optical fibers. In another embodiment of the present disclosure, the second diameter of each buffer tube of the first plurality of buffer tubes 122 and the second plurality of buffer tubes 124 may vary. The second diameter of each buffer tube of the first plurality of buffer tubes 122 and the second plurality of buffer tubes 124 has a tolerance of about ±0.025 millimeter.

Each buffer tube in the first plurality of buffer tubes 122 and the second plurality of buffer tubes 124 is made of a first material layer 126 and a second material layer 128. The first material layer 126 is made of polybutylene terephthalate. In general, the polybutylene terephthalate material is a semi crystalline material that is suitable for construction of loose buffer tubes. In addition, the polybutylene terephthalate material combines sufficient strength and flexibility that are required for loose buffer tubes. The first material layer 126 is inner layer of each buffer tube in the first plurality of buffer tubes 122 and the second plurality of buffer tubes 124. The second material layer 128 is made of polycarbonate. The second material layer 128 surrounds the first material layer 126. The second material layer 128 is outer layer of each buffer tube in the first plurality of buffer tubes 122 and the second plurality of buffer tubes 124. In general, the polybutylene terephthalate and polycarbonate increases crush resistance of the optical fiber cable 100. In an embodiment of the present disclosure, the optical fiber cable 100 has crush resistance of about 500 Newton per 10 centimeter. In addition, the polybutylene terephthalate and polycarbonate prevents indentation in each buffer tube of the first plurality of buffer tubes 122 and the second plurality of buffer tubes 124. In general, indentation restricts the movement of the plurality of optical fibers 130 in buffer tubes. Also, indentation is caused by the third layer 112.

The first material layer 126 has thickness of about 75 microns. In an embodiment of the present disclosure, the thickness of the first material layer 126 may vary. The second material layer 128 has a thickness of about 75 microns. In an embodiment of the present disclosure, the thickness of the second material layer 128 may vary. Accordingly, total thickness of each buffer tube of the first plurality of buffer tubes 122 and the second plurality of buffer tubes 124 is 0.15 millimeter. The thickness of each buffer tube of the first plurality of buffer tubes 122 and the second plurality of buffer tubes 124 has a tolerance of about ±0.025 millimeter.

The optical fiber cable 100 includes the third layer 112. The third layer 112 surrounds the second layer 110. The third layer 112 includes a plurality of binder yarns. In general, the binder yarns prevent ingression of water in the optical fiber cable 100. In an embodiment of the present disclosure, the third layer 112 facilitates absorption of water and moisture. In addition, the third layer 112 prevents ingression of the water inside the second layer 110. In an embodiment of the present disclosure, the third layer 112 of the optical fiber cable 100 may have any number of yarns.

The optical fiber cable 100 includes the fourth layer 114. The fourth layer 114 surrounds the third layer 112. The fourth layer 114 is a jacket layer. In an embodiment of the present disclosure, the fourth layer 114 is made of medium density polyethylene material. In general, the medium density polyethylene material has density in a range of 0.926 gram/centimeter$^3$-0.940 gram/centimeter$^3$. In another embodiment of the present disclosure, the fourth layer 114 is made of high density polyethylene material. In general, the high density polyethylene material has density in a range of about 0.941 gram/centimeter$^3$-0.971 gram/centimeter$^3$. In yet another embodiment of the present disclosure, the fourth layer 114 is made of polypropylene. In general, the polypropylene material has density in a range of 0.90 gram/centimeter$^3$-0.92 gram/centimeter$^3$. In yet another embodiment of the present disclosure, the fourth layer 114 may be made of any suitable material.

The fourth layer 114 is characterized by thickness. The fourth layer 114 has thickness in a range of about 0.5 millimeter. The thickness of the fourth layer 114 has a tolerance of about ±0.1 millimeter. In an embodiment of the present disclosure, the thickness of the fourth layer 114 may vary. The fourth layer 114 protects the optical fiber cable 100 against crush, bend and tensile stress.

The optical fiber cable 100 includes the plurality of water swellable yarns 116. The plurality of water swellable yarns 116 is positioned over the central strength member 106. The plurality of water swellable yarns 116 prevents ingression of water in the optical fiber cable 100. In addition, the plurality of water swellable yarns 116 around the central strength member 106 is used to absorb moisture inside the optical fiber cable 100.

The optical fiber cable 100 includes the plurality of ripcords 118, 120. In an embodiment of the present disclosure, the plurality of ripcords 118, 120 is positioned in between the third layer 112 and fourth layer 114. The plurality of ripcords 118, 120 facilitates stripping of the fourth layer 114. In an embodiment of the present disclosure, each of the plurality of ripcords 118, 120 has a circular cross-section. In an embodiment of the present disclosure, a number of the plurality of ripcords 118, 120 is 2. In another embodiment of the present disclosure, the number of the plurality of ripcords 118, 120 may vary. In an embodiment of the present disclosure, each of the plurality of ripcords 118, 120 is made of polyester. In another embodiment of the present disclosure, each of the plurality of ripcords is made of aramid. In yet another embodiment of the present disclosure, each of the plurality of ripcords 118, 120 is made of any other suitable material.

The optical fiber cable 100 has a weight of about 70 kilogram per kilometer. In an embodiment of the present disclosure, the optical fiber cable 100 has crush resistance of about 500 Newton per 10 centimeter. In general, the crush resistance determines the ability of the optical fiber cable 100 to withstand and/or recover from the effects of compressive forces. In an embodiment of the present disclosure, the optical fiber cable 100 has a maximum tensile strength of about 1000 Newton. In an embodiment of the present disclosure, the optical fiber cable 100 has impact strength of about 2 Newton meter. The impact strength is the ability of the optical fiber cable 100 to absorb shock and impact energy without breaking. In an embodiment of the present disclosure, the optical fiber cable 100 has bending radius of about 20 D during installation of the optical fiber cable 100. In an embodiment of the present disclosure, the optical fiber cable 100 has bending radius of about 15 D after installation of the optical fiber cable 100. In addition, the optical fiber cable 100 has overall diameter in a range of about 8.6 millimeters to 9.2 millimeters. In an example, the optical fiber cable 100 has diameter of about 8.6 millimeters. In another embodiment of the present disclosure, the optical fiber cable 100 has any suitable diameter. In an embodiment of the present disclosure, the overall diameter of the optical fiber cable 100 increases blowing performance of the optical fiber cable 100 in the micro duct. In general, blowing of the optical fiber cable 100 is the process of installation of the optical fiber cable 100 into the micro ducts. In general, the micro duct is a duct with a small diameter. In an embodiment of the present disclosure, the optical fiber cable 100 is blown up to a distance of 1000 meters inside the micro duct having diameter of about 12 millimeter. In another embodiment of the present disclosure, the optical fiber cable 100 is blown up to a distance of 1500 meters inside the micro duct having diameter of about 14 millimeter.

The optical fiber cable has numerous advantages over the prior art. The optical fiber cable is easy to install in the micro ducts. In addition, the optical fiber cable has low diameter. Moreover, the optical fiber cable has a reduced weight. The low diameter and the reduced weight enable easier installation of the optical fiber cable in the micro ducts. Further, the low diameter and the reduced weight increases the blowing performance of the optical fiber cable. Furthermore, the optical fiber cable has dual layer of the plurality of buffer tubes. Each of the plurality of buffer tubes is made of polybutylene terephthalate and polycarbonate. The combination of polybutylene terephthalate and polycarbonate increases crush resistance of the optical fiber cable and prevents indentation.

The foregoing descriptions of pre-defined embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

What is claimed is:

1. An optical fiber cable (100) for installation in micro ducts comprising:
    a first layer (108), wherein the first layer (108) comprises a first plurality of buffer tubes (122);
    a second layer (110), wherein the second layer (110) comprises a second plurality of buffer tubes (124), wherein the second layer (110) surrounds the first layer (108),
    wherein each buffer tube of the first plurality of buffer tubes (122) and the second plurality of buffer tubes (124) has a thickness of at most 0.15 millimeter;
    a third layer (112) surrounding the second layer (110), wherein the third layer (112) is made of a plurality of binder yarns, wherein the third layer (112) facilitates absorption of water, moisture and prevents ingression of the water inside the optical fiber cable (100); and
    a fourth layer (114) surrounding the third layer (112), wherein the fourth layer (114) is a jacket layer.

2. The optical fiber cable (100) as claimed in claim 1, wherein each buffer tube of the first plurality of buffer tubes (122) and the second plurality of buffer tubes (124) comprises:
    a first material layer (126); and
    a second material layer (128) surrounding the first material layer (126),
    wherein at least one of:
        the first material layer (126) is made of polybutylene terephthalate, and
        the second material layer (128) is made of polycarbonate.

3. The optical fiber cable (100) as claimed in claim 1, wherein each buffer tube of the first plurality of buffer tubes (122) and the second plurality of buffer tubes (124) comprises a first material layer (126) and a second material layer (128), wherein at least one of:
    the first material layer (126) has a thickness of 75 microns, and
    the second material layer (128) has a thickness of 75 microns.

4. The optical fiber cable (100) as claimed in claim 1, wherein each buffer tube of the first plurality of buffer tubes (122) and the second plurality of buffer tubes (124) has at least one of:
    a first diameter of 1.25 millimeter, and
    a second diameter of 1.55 millimeter.

5. The optical fiber cable (100) as claimed in claim 1, wherein each buffer tube of the first plurality of buffer tubes (122) and the second plurality of buffer tubes (124) encloses a plurality of optical fibers (130), wherein total number of optical fibers in each of the first plurality of buffer tubes (122) and the second plurality of buffer tubes (124) is 24.

6. The optical fiber cable (100) as claimed in claim 1, wherein each buffer tube of the first plurality of buffer tubes (122) and the second plurality of buffer tubes (124) is filled with gel, wherein the gel prevents ingression of water inside each buffer tube of the first plurality of buffer tubes (122) and the second plurality of buffer tubes (124).

7. The optical fiber cable (100) as claimed in claim 1, further comprising at least one of:
    a plurality of water swellable yarns (116) positioned over a central strength member (106), wherein the plurality of water swellable yarns (116) prevent ingression of water inside the optical fiber cable (100),
    a plurality of ripcords (118,120), positioned diametrically opposite between the third layer (112) and the fourth layer (114), wherein the plurality of ripcords (118, 120) facilitate stripping of the fourth layer (114).

8. The optical fiber cable (100) as claimed in claim 1, wherein the fourth layer (114) has a thickness of 0.5 millimeter.

9. The optical fiber cable (100) as claimed in claim 1, wherein at least one of:
    the optical fiber cable (100) has tensile strength in a range of 500 Newton to 1000 Newton, wherein the optical fiber cable (100) has crush resistance of 500 Newton per 10 centimeter,
    the optical fiber cable (100) with 432 optical fibers has a diameter in a range of 8.6 millimeter to 9.2 millimeter.

10. The optical fiber cable (100) as claimed in claim 1, wherein the optical fiber cable (100) can be blown up to 1000 meters in 12 mm duct and up to 1500 meters in 14 mm duct.

11. An optical fiber cable (100) for installation in micro ducts comprising:
- a first layer (108), wherein the first layer (108) comprises a first plurality of buffer tubes (122);
- a second layer (110), wherein the second layer (110) comprises a second plurality of buffer tubes (124), wherein the second layer (110) surrounds the first layer (108),
- wherein each buffer tube of the first plurality of buffer tubes (122) and the second plurality of buffer tubes (124) has at least one of:
  - a first diameter of 1.25 millimeter, and
  - a second diameter of 1.55 millimeter,
- wherein each buffer tube of the first plurality of buffer tubes (122) and the second plurality of buffer tubes (124) comprises:
  - a first material layer (126), and
  - a second material layer (128) surrounding the first material layer (126);
- a third layer (112) surrounding the second layer (110), wherein the third layer (112) is made of a plurality of binder yarns, wherein the third layer (112) facilitates absorption of water, moisture and prevents ingression of the water inside the optical fiber cable (100); and
- a fourth layer (114) surrounding the third layer (112), wherein the fourth layer (114) is a jacket layer.

12. The optical fiber cable (100) as claimed in claim 11, wherein at least one of:
- the first material layer (126) is made of polybutylene terephthalate, and
- the second material layer (128) is made of polycarbonate.

13. The optical fiber cable (100) as claimed in claim 11, wherein each buffer tube of the first plurality of buffer tubes (122) and the second plurality of buffer tubes (124) has a thickness of at most 0.15 millimeter.

14. The optical fiber cable (100) as claimed in claim 11, wherein at least one of:
- the first material layer (126) has a thickness of 75 microns, and
- the second material layer (128) has a thickness of 75 microns.

15. The optical fiber cable (100) as claimed in claim 11, wherein each buffer tube of the first plurality of buffer tubes (122) and the second plurality of buffer tubes (124) encloses a plurality of optical fibers (130), wherein total number of optical fibers in each of the first plurality of buffer tubes (122) and the second plurality of buffer tubes (124) is 24.

16. The optical fiber cable (100) as claimed in claim 11, wherein each buffer tube of the first plurality of buffer tubes (122) and the second plurality of buffer tubes (124) is filled with gel, wherein the gel prevents ingression of water inside each buffer tube of the first plurality of buffer tubes (122) and the second plurality of buffer tubes (124).

17. The optical fiber cable (100) as claimed in claim 11, further comprising at least one of:
- a plurality of water swellable yarns (116) positioned over a central strength member (106), wherein the plurality of water swellable yarns (116) prevent ingression of water inside the optical fiber cable (100),
- a plurality of ripcords (118,120), positioned diametrically opposite between the third layer (112) and the fourth layer (114), wherein the plurality of ripcords (118, 120) facilitate stripping of the fourth layer (114).

18. The optical fiber cable (100) as claimed in claim 11, wherein the fourth layer (114) has a thickness of 0.5 millimeter.

19. The optical fiber cable (100) as claimed in claim 11, wherein at least one of:
- the optical fiber cable (100) has tensile strength in a range of 500 Newton to 1000 Newton, wherein the optical fiber cable (100) has crush resistance of 500 Newton per 10 centimeter,
- the optical fiber cable (100) with 432 optical fibers has a diameter in a range of 8.6 millimeter to 9.2 millimeter.

20. The optical fiber cable (100) as claimed in claim 11, wherein the optical fiber cable (100) can be blown up to 1000 meters in 12 mm duct and up to 1500 meters in 14 mm duct.

* * * * *